US010277285B2

(12) United States Patent
Zarifi et al.

(10) Patent No.: US 10,277,285 B2
(45) Date of Patent: Apr. 30, 2019

(54) SOFT TRANSMIT POINT AND USER EQUIPMENT ASSOCIATION METHOD FOR RADIO ACCESS VIRTUALIZATION

(71) Applicant: Huawei Technologies Co., Ltd., Shenzhen (CN)

(72) Inventors: Keyvan Zarifi, Ontario (CA); Mohammadhadi Baligh, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/642,214

(22) Filed: Mar. 9, 2015

(65) Prior Publication Data

US 2015/0257169 A1    Sep. 10, 2015

Related U.S. Application Data

(60) Provisional application No. 61/949,925, filed on Mar. 7, 2014.

(51) Int. Cl.
| | | |
|---|---|---|
| *H04B 7/024* | (2017.01) | |
| *H04L 5/00* | (2006.01) | |
| *H04W 72/12* | (2009.01) | |

(52) U.S. Cl.
CPC ............ *H04B 7/024* (2013.01); *H04L 5/0035* (2013.01); *H04L 5/0048* (2013.01); *H04L 5/0058* (2013.01); *H04W 72/1236* (2013.01)

(58) Field of Classification Search
CPC ..... H04B 7/024; H04L 25/024; H04L 5/0058; H04L 5/005; H04L 5/0035; H04L 5/0048; H04W 72/1236; H04W 48/16; H04W 24/02; H04W 4/08; H04W 72/1226; H04W 48/18; H04W 92/20; H04W 28/06; H04W 72/1242; H04W 28/18; H04W 64/003; H04W 88/08; H04W 8/22; H04W 8/16;

(Continued)

(56) References Cited

U.S. PATENT DOCUMENTS

| | | | |
|---|---|---|---|
| 5,748,844 A | 5/1998 | Marks | |
| 8,554,224 B2 * | 10/2013 | Soliman | .............. H04W 36/165 455/436 |

(Continued)

FOREIGN PATENT DOCUMENTS

| | | |
|---|---|---|
| CN | 102714809 B | 8/2014 |
| WO | 03071740 A1 | 8/2003 |

*Primary Examiner* — George Eng
*Assistant Examiner* — Hung K Du
(74) *Attorney, Agent, or Firm* — Slater Matsil, LLP

(57) ABSTRACT

Embodiments of the present invention provide a systematic solution to virtual random access (VRA) that dynamically and adaptively forms various metrics. The present invention facilitates dynamic data pipelining between the network-side and the UE-sides without the need to use the same cell-association concept as current wireless networks and provides soft associations between dynamic groups of UEs and TPs based on various UE, TP, and network related metrics. To provide efficient collaborative grouping and association among TPs and UEs, the present invention features a soft TP-UE association map based on several factors, such as individual UE metrics, TP metrics, effects of neighboring or nearby UEs (e.g., interference), and historical network knowledge.

43 Claims, 9 Drawing Sheets

Soft TP-UE association

(58) Field of Classification Search
CPC ... H04W 72/04; H04W 72/121; H04W 28/08; H04W 52/04
See application file for complete search history.

(56) References Cited

U.S. PATENT DOCUMENTS

| | | | |
|---|---|---|---|
| 9,615,292 B2* | 4/2017 | Kang | H04W 28/18 |
| 2010/0144334 A1* | 6/2010 | Gorokhov | H04L 5/0035 |
| | | | 455/418 |
| 2011/0256901 A1 | 10/2011 | Guey | |
| 2011/0281585 A1 | 11/2011 | Kwon et al. | |
| 2012/0135741 A1* | 5/2012 | Zhou | H04L 5/005 |
| | | | 455/450 |
| 2013/0021925 A1 | 1/2013 | Yin et al. | |
| 2013/0040683 A1* | 2/2013 | Siomina | H04W 28/0236 |
| | | | 455/517 |
| 2013/0315156 A1 | 11/2013 | Xiao et al. | |
| 2013/0331090 A1 | 12/2013 | Kim et al. | |
| 2014/0003268 A1 | 1/2014 | Zarifi et al. | |
| 2015/0117216 A1* | 4/2015 | Anand | H04L 47/125 |
| | | | 370/236 |
| 2016/0119941 A1* | 4/2016 | Ko | H04W 52/04 |
| | | | 455/453 |

* cited by examiner

Soft TP-UE association

Hard TP-UE association

SOFT TRANSMIT POINT AND USER EQUIPMENT ASSOCIATION METHOD FOR RADIO ACCESS VIRTUALIZATION

CROSS-REFERENCE TO RELATED APPLICATIONS

The present application claims priority to provisional application Ser. No. 61/949,925, filed on Mar. 7, 2014, entitled "UE CENTRIC SOFT TP AND UE ASSOCIATION METHOD FOR RADIO ACCESS VIRTUALIZATION" naming the same inventors as in the present application. The contents of the above referenced provisional application are incorporated by reference, the same as if fully set forth herein.

FIELD

Embodiments of the present invention generally relate to the field of radio access virtualization. More specifically, embodiments of the present invention relate to association and collaborative grouping methods for radio access virtualization.

BACKGROUND

As wireless communication devices such as wireless phones, tablet computers, and netbooks have exploded in popularity, the ability to efficiently and reliably provide wireless service to a variety of devices over large areas has become a critical need for service providers. Current wireless antenna arrays are reaching limiting factors in meeting these demands. These existing technologies are typically implicitly or explicitly based on two semi-static parameters. The first factor is cell attachment, where user equipment (UE) is attached to the cell with the highest RSRP (Reference Signal Received Power). The second factor considered is the mutual interference level, where the transmit points (TPs) that inflict higher interference levels on other TP's attached UEs are generally better candidates for cooperation.

Presently, developing wireless technologies have characteristics that render current interface management, radio access, and TP-UE association techniques, such as CoMP (Cooperative Multi Point) and C-RAN (Cloud Radio Access Network), inefficient. For example, developing wireless networks have inhomogeneous and dynamic network structures, including inhomogeneous and dynamic TPs and UEs, inhomogeneous types of equipment, inhomogeneous types of traffic, and inhomogeneous priorities and weights that are not effectively managed by CoMP and C-RAN. Furthermore, developing wireless networks may rely on inter-UE cooperation that is not supported by existing association techniques.

Prior solutions, such as the C-RAN TP grouping algorithms, rely on hard TP-UE association based on which UE belongs to a cell with the highest RSRP. What is needed is an efficient and dynamic TP grouping and TP-UE association technology that considers important factors, such as TP-TP sum mutual interference levels, the effect of cell loads, UE collaboration, equipment types, traffic types, UE importance, UE priorities, and historic network performance knowledge.

SUMMARY

Embodiments of the present invention provide a systematic solution to virtual random access (VRA) that dynamically and adaptively forms collaborative groups based on various metrics. While some legacy wireless networks operate based on the hard TP-UE association, where each UE is generally connected to a serving TP that is determined based on a single semi-static metric, such as maximum RSRP, the present invention facilitates dynamic data pipelining between the TP-side and the UE-side without the need to use the same cell-association concept as current wireless networks, and provides soft associations between dynamic groups of UEs and TPs based on various UE, TP, and network related metrics.

In one embodiment, a method for dynamically associating TPs with UEs in a radio network is described. The method includes generating a dynamic association map comprising multiple UEs and multiple TPs associated with the UEs, determining bonding levels of pairs of the TPs based on the dynamic association map, grouping the TPs based on the bonding levels and the dynamic association map to form collaborative TP groups, and generating a new dynamic association map based on the collaborative TP group.

In another embodiment, a method for dynamically forming collaborative groups of TPs in a radio network is disclosed. The method includes grouping TPs to form a first set of collaborative TP groups based on a first set of dynamic associations between TPs and UEs and a first set of bonding levels between pairs of TPs, grouping UEs to form a first set of collaborative UE groups, determining that a first performance metric associated with the first configuration is not satisfied using the first collaborative UE group and the first collaborative TP group, identifying boundary UEs that do not satisfy the first performance metric using the first set of collaborative UE groups and the first set of collaborative TP groups, generating a second set of dynamic associations between the TPs and the UEs and a second set of bonding levels between pairs of the TPs, wherein the a weight associated with the boundary UEs is increased, and grouping the TPs to form a second set of collaborative TP groups and grouping the UEs to form a second collaborative UE group, wherein one or more of the boundary UEs satisfy the first performance metric using the second set of dynamic associations between the TPs and the UEs.

In another embodiment, a method for forming groups of Transmit Points in a radio network is disclosed. The method includes determining soft associations between transmit points (TPs) and UEs of the radio network, determining loading values for each of the of TPs, determining bonding levels for pairs of TPs based on the soft associations and the loading values, and generating a first overlay, grouping subsets of the TPs into virtual TPs (VTPs) based on the bonding levels.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1A:
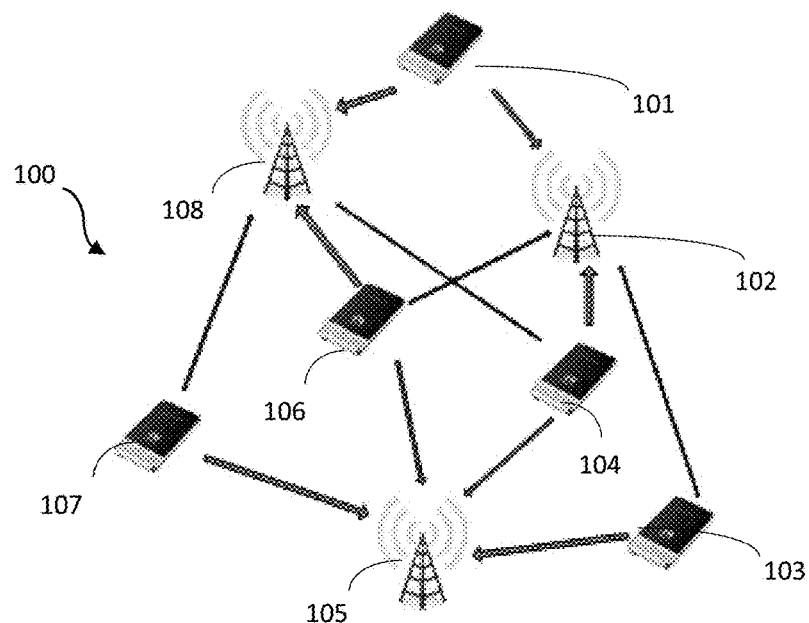
FIG. 1A is a diagram illustrating an exemplary wireless network 100 comprising a plurality of TPs and associated UEs, according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Embodiments are well suited to performing various other steps or variations of the steps recited in the flowchart of the figures herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a wireless network or electronic computing device that manipulates and transforms data represented as physical (electronic) quantities within the system's registers and memories into other data similarly represented as physical quantities within the system memories or registers or other such information storage, transmission or display devices.

Embodiments of the present invention relate to association methods for radio access virtualization that provide efficient grouping and association among TPs and UEs utilizing the characteristics of recent advancements in wireless network technology. To provide efficient grouping and association among TPs and UEs, the present invention features a soft TP-UE association map based on several factors, such as individual UE metrics, TP metrics, effects of neighboring or nearby UEs (e.g., inter-UE collaboration), and historical network knowledge.

Embodiments of the present invention provide a systematic solution to virtual random access (VRA) that dynamically and adaptively forms various sets of collaborating TP and/or UE groups. While some legacy wireless networks operate based on the hard TP-UE association, where it is assumed that each UE is generally connected to a serving TP that is determined based on a single semi-static metric such as maximum RSRP, the present invention facilitates dynamic data pipelining between the network-side and the UE-sides without the need to use the same cell-association concept as current wireless networks, and provides soft associations between dynamic groups of UEs and TPs based on various UE, TP, and network related metrics. These associations may be transparent to the UEs.

The grouping and association techniques described herein maintain a level of complexity and overhead similar to or the same as currently-employed C-RAN and CoMP solutions while offering vastly superior performance. Furthermore, the solutions described herein are largely compatible with current wireless networks. As a result, the present invention may provide enhanced network coverage and throughput, and mitigate cell boundary experience while providing balanced loads across the TPs.

Embodiments of the invention will now be described, although it will be understood that they are not intended to limit the claimed subject matter to these embodiments.

With regard now to FIG. 1A, an exemplary wireless network 100 consisting of multiple exemplary UEs (e.g., UE 101) and TPs (e.g., TP 102) is depicted according to some embodiments of the present invention. The UEs may comprise wireless phones (e.g., smartphones), computers, and wireless access points, for example. A TP may comprise any equipment used to send and/or receive radio signals (e.g., a transmitter, receiver, transceiver, etc.).

The radio network 100 generates and maintains a UE-TP association table which comprises weighted relations between UEs and neighboring TPs based on one or more metrics. The metrics used may include individual UE metrics, such as predicted throughput from each TP, the weight of a UE based on traffic type, importance, or incentives. Metrics based on neighboring UE effects (e.g., Inter-UE collaboration) and/or soft TP load determined based on a weighted sum of the soft TP-UE associations may be considered. Other metrics considered may include historic network knowledge (e.g., performance history). These TP-UE associations are described as "soft" as they are percentage-wise associations of each UE to multiple TPs and are adaptable and can dynamically change if their determining metrics change. For example, an exemplary UE1 may be 20% associated with exemplary TP1, 30% associated with exemplary TP2, and 50% associated with exemplary TP3. Therefore, the association between UE1 and TP3 is the strongest. This is in contrast with the conventional "hard" associations that are not typically percentage-wise and fully associate each UE to a default serving TP, typically based on RSRP. As depicted in FIG. 1A, a UE may be associated with multiple TPs. For example, UE 101 is associated with TPs 102 and 108, and UE 103 is associated with TP 102 and 105. These associations are soft and may change over time based on a variety of factors.

Figure 1B:
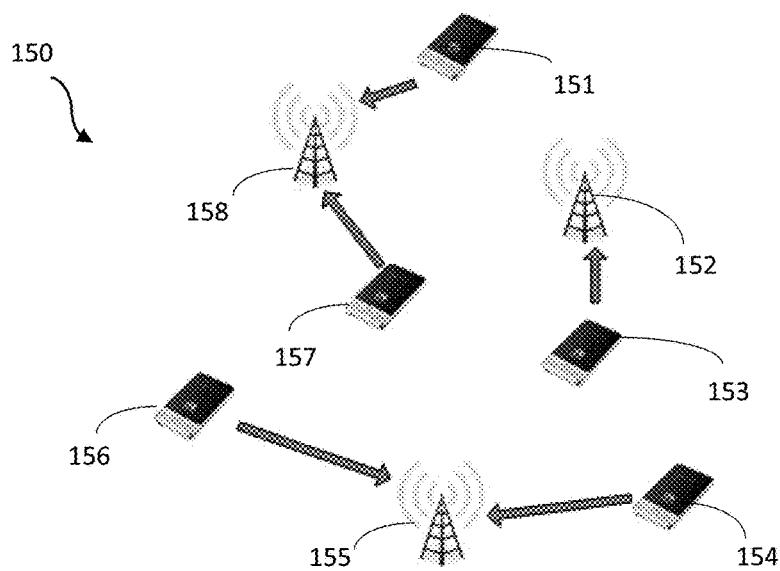
FIG. 1B is a diagram illustrating an exemplary wireless network 150 with conventional hard TP-UE associations based on RSRP.

FIG. 1B depicts an exemplary wireless network 150 with conventional hard TP-UE association based on maximum RSRP. A UE (e.g., UE 151, 153, 154, 156, and 175) has a hard association with exactly one TP (e.g., TP 152, 155, or 158). Generally these associations do not change unless the TP with the highest RSRP to the UE changes.

Figure 2:
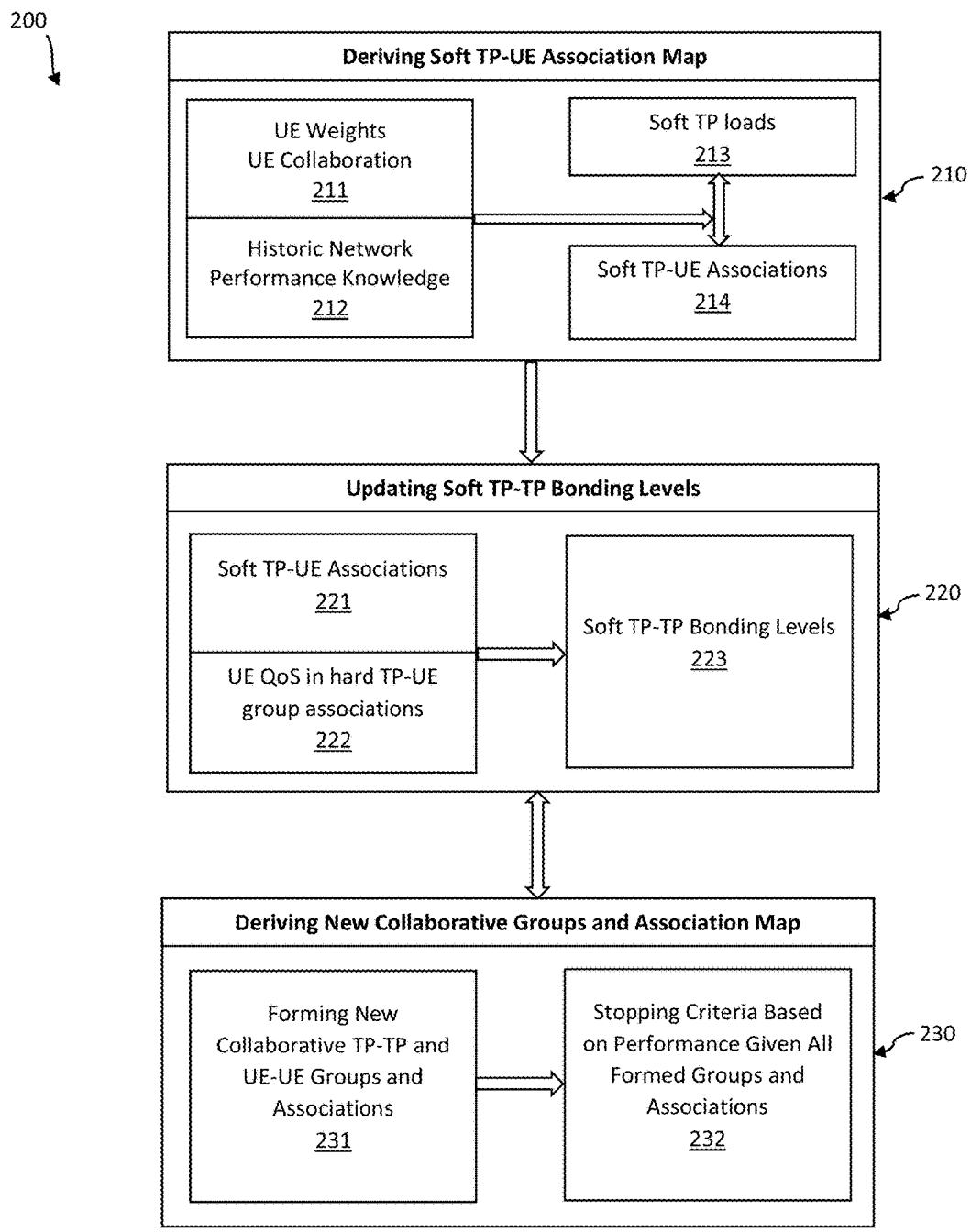
FIG. 2 is a flow chart depicting exemplary computer-implemented steps 200 for generating a soft TP-UE association table, soft TP-TP bonding levels, and collaborative TP and UE groups according to embodiments of the present invention.

With regard now to FIG. 2, a flow chart 200 describing exemplary steps for generating a soft UE-TP association table, soft TP-TP bonding levels, collaborative TP groups, and collaborative UE groups is depicted according to embodiments of the present invention. At block 210, a soft TP-UE association map is derived based on several factors. A TP-UE association map determines which UEs are associated with which TPs. An individual UE may be associated with multiple TPs, and the associations are adaptable to changing circumstances. At block 220, soft TP-TP bonding levels are determined. TPs are grouped into TP-TP pairs, where each TP of the TP-TP pairs causes interference to a signal of one or more UEs associated with one of the TPs of the TP-TP pair. At block 230, new collaborative groups and association maps are formed. UE-centric network-aware collaborative TP groups may be formed among TPs, and UE-centric network-aware collaborative UE groups may be formed among UEs.

In one example, TPs in the same collaborative TP group transmit the same signal. Alternatively, the TPs of the TP group may take turns transmitting a signal so that the degree of interference between the UEs associated with the TPs in the same collaborating TP group is mitigated. Collaborative groups of UE may be formed so that the UEs can efficiently share a TP signal. For example, one UE of the UE group may receive a signal from an associated TP and distribute the signal to the other UEs of the UE group. Alternatively the UEs of the UE group may take turns sending and receiving signals to maximize throughput or reduce latency, for example. According to some embodiments, UE groups are associated with TP groups in order to improve network-wide quality of service (QoS).

Block 210 depicts an approach to deriving a soft TP-UE association map. Several metrics are considered in generating the soft TP-UE association map, including UE weights (e.g., importance) and UE group collaboration at step 211, historic network performance knowledge (e.g., historic TP load, historic throughput, etc.) at step 212, and current soft TP load at step 213. Based on these metrics, a soft TP-UE association map is generated at step 214.

Block 220 depicts an approach to updating soft TP-TP bonding levels, where each TP-TP pair is associated with a bonding level representing how well the TP pair can cooperative in a collaborative TP group. Soft TP-TP bonding levels may be affected by various factors, such as a degree of interference between a TP of the TP-TP pair and a UE associated with the other TP of the TP-TP pair. The higher the bonding level, the more efficient the cooperation between the TP pair to serve UEs. The soft TP-UE Associations generated in step 214 of block 210 are used to derive soft TP-TP bonding levels at step 221. A UE QoS metric of an existing hard TP-UE association may be considered at step 222. The new soft TP-TP bonding levels are updated at step 223.

New collaborative groups and an updated association map are generated at block 230. Based on the collaborative TP groups an UE groups considered at step 231, stopping criteria is evaluated against the measured performance of all UEs in the network in all collaborative TP group and collaborative UE group sets. If the measured performance is insufficient, new groups and TP-UE associations may be formed using a recursive process described below.

Figure 3:
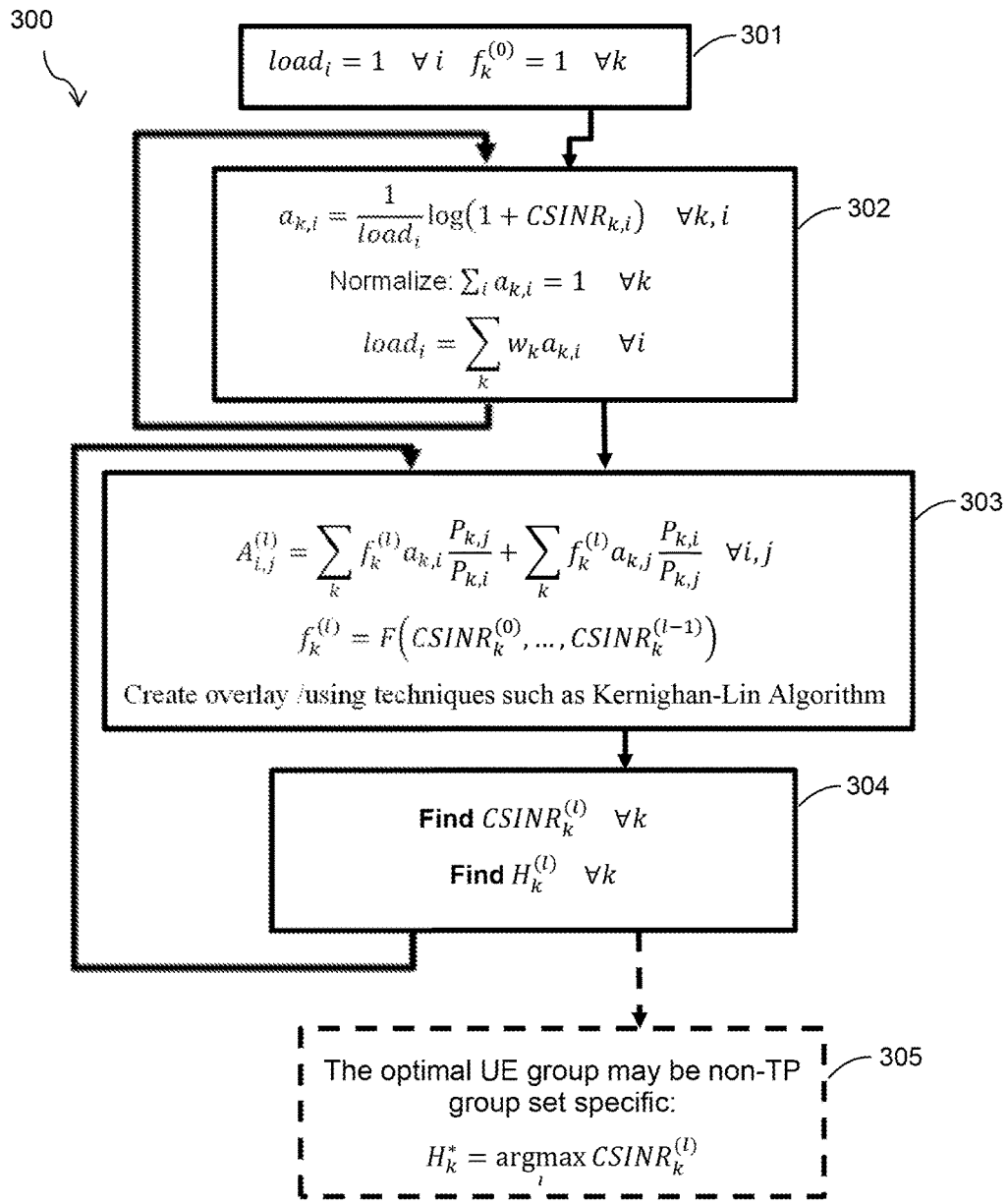
FIG. 3 is a flow chart depicting exemplary computer-implemented steps 300 for calculating metrics used to form a soft UE-TP association table, updating soft TP-TP bonding levels, and deriving new collaborative TP and UE groups according to embodiments of the present invention.

With regard now to FIG. 3, a flow chart 300 describing exemplary computer-implemented steps for generating and updating a soft UE-TP association table, soft TP-TP bonding levels, collaborative TP groups, and collaborative UE groups is depicted according to embodiments of the present invention. Step 301 represents an initial condition, where i represents a TP index, k represents a UE index, and the load indicates the expected load of each TP based on a weighted sum of all soft UE associations with that TP.

$$\text{load}_i = 1 \,\forall i \, f_k^{(0)} = 1 \,\forall k$$

The variables used in FIG. 3 are described in Table I below.

TABLE I

| Variable | Description |
|---|---|
| i, j | TP index |
| k | UE index |
| l | Overlay index |
| $w_k$ | Weight determined by the traffic type of UE k |
| $H_k$ | Set of all potential Helping UEs (HUEs) for UE k |
| $P_{k,i}$ | Received power from TP i at UE k |
| $CSINR_{k,i}(H)$ | SINR of UE k assuming that i is the serving cell and all UEs in set H are helping. |
| $CSINR_{k,i}$ | $\max\limits_{\forall H \subseteq H_k} CSINR_{k,i}(H)$ |
| $CSINR_k^{(l)}(H)$ | SINR of UE k in overlay l with all UEs in set H helping |
| $CSINR_k^{(l)}$ | $\max\limits_{\forall H \subseteq H_k} CSINR_k^{(l)}(H)$ |
| $H_k^{(l)}$ | $\max\limits_{\forall H \subseteq H_k} CSINR_k^{(l)}$ |

At step 302, a set of soft TP-UE associations is generated based on the initial loads of step 301. At step 303, a set of TP-TP bonding levels is determined, where the TP-TP bonding levels represent how well the TP pair can cooperative in a collaborative TP group, and a first set of TP groups (e.g., a first overlay) is formed based on the TP-TP bonding levels and the TP-UE associations. A first set of collaborating UE groups is then formed and performance metrics associated with the first set of collaborating UE groups is determined using the first overlay. A second set of TP-TP bonding levels is determined, where the UEs associated with unsatisfactory performance using the first overlay are given higher weight, and the UEs associated with satisfactory performance in the first overlay are given a lower weight. Once the second set of bonding levels are generated, a second set of TP groups (e.g., a second overlay) is formed, a second UE grouping, a new UE performance metric, and TP-TP bonding levels are updated to create a third set of coopering TPs (e.g., a third overlay). The iterative steps are repeated to form new overlays until the performance of all UEs in at least one overlay is guaranteed to meet a performance criteria. The iterative steps are indicated by the arrow/loop from the bottom of the box 302 to the top of the box 302, and from the bottom of box 304 to the top of box 303. Soft TP-UE associations are formed using the equations:

$$a_{k,i} = \frac{1}{load_i} \log(1 + CSINR_{k,i}) \; \forall \, k, i$$

$$\text{Normalize} \sum_i a_{k,i} = 1 \; \forall \, k$$

$$load_i = \sum_k w_k a_{k,i} \; \forall \, i$$

The associations are optionally normalized for convenience such that the sum of all associations is equal to 1. $Load_i$ is determined and represents is a weighted sum of the soft UE associations to $TP_i$. $Load_i$ is used to re-calculate the weighted sum of $UE_k$ to $TP_i$, alpha{k,i}, which is the expected throughput of the $UE_k$ that can be provided by $TP_i$. The recursive process of updating $load_i$ and alpha{k,i} continues until convergence or a stopping criteria is met. At step 303, the soft TP-TP bonding levels are updated and a new set of collaborating TP groups (e.g., a new overlay) and one or more association maps are formed by adding a normalized interference level of $TP_j$ that is produced in regard to $UE_k$ to the interference level of $TP_i$ that is produced in regard to $UE_k$.

$$A_{i,j}^{(l)} = \sum_k f_k^{(l)} a_{k,i} \frac{P_{k,j}}{P_{k,i}} + \sum_k f_k^{(l)} a_{k,j} \frac{P_{k,i}}{P_{k,j}} \; \forall \, i, j$$

$$f_k^{(l)} = F(CSNIR_k^{(0)}, \ldots, CSINR_k^{(l-1)})$$

Multiple overlays may be produced, for example:

$$f_k^{(l)} = \begin{cases} 0 & \text{if } \max\{CSINR_k^{(0)}, \ldots, CSINR_k^{(l-1)}\} \geq c(\text{dB}) \\ 1 - \max\{0, \max\{CSINR_k^{(0)}, \ldots, CSINR_k^{(l-1)}\}/c(\text{dB})\} & \text{else} \end{cases}$$

$f_k^{(l)}$ is determined such that the UEs that receive a performance above the threshold c in any of the l-1 overlays will have zero weight when updating the soft TP-TP bonds $A_{i,j}^{(l)}$ for creating the l-th overlay. In turn, if the received performance of the kth UE in all already-created l-1 overlays is very low, $f_k^{(l)}$ has a weight close to 1. This guarantees that the UEs that cannot be served properly (e.g., meet the performance criteria) in any of the existing overlays (e.g., the boundary UEs in the existing overlays) are given a higher weight in forming the new overlay. The overlays may be created using techniques such as a Kernighan-Lin Algorithm. An overlay is a set of generated collaborative TP groups, and each time the process reaches step 303 in the iterative process, the soft TP-TP bonding levels are determined by updating the $f_k^{(l)}$ parameters. The updated soft TP-TP bonding levels are used as an input to a partitioning algorithm (e.g., a Kernighan-Lin algorithm) to partition the network of TPs into a set of collaborative TP groups. The union of these collaborative TP groups is an overlay that covers the whole network.

After the new set of collaborative TP group is generated, a set of collaborative UE groups are formed. The process returns to set 303 and updates $f_k^{(l)}$ parameters and the TP-TP bonding levels. Again, these bonding levels are used in the partitioning algorithm to generate a new collaborative TP group set, for example, to improve the performance of the boundary UEs, (e.g., the UEs that do not have satisfactory performance measure metric in the previous overlays). According to some embodiments, this process is continued until a UE-centric stopping criterion (e.g., a QoS metric) is satisfied.

At step 304, new collaborative UE groups are determined. Potential UE grouping candidates (e.g., helping UEs) are identified based a performance metric of each UE (e.g., collaborative signal-to-interference-plus-noise ratio). An optimal UE group may be determined at 305, or the process may return to step 303. The optimal UE group may be non-TP group set specific. Overlays are generated in an effort to guarantee that the UEs that are boundary UE in existing overlays will not be boundary UEs in a new overlay. According to some embodiments, the network switches between multiple overlays (e.g., 3 or 4 overlays) to adapt to changing network needs or measured network performance.

Figure 4:
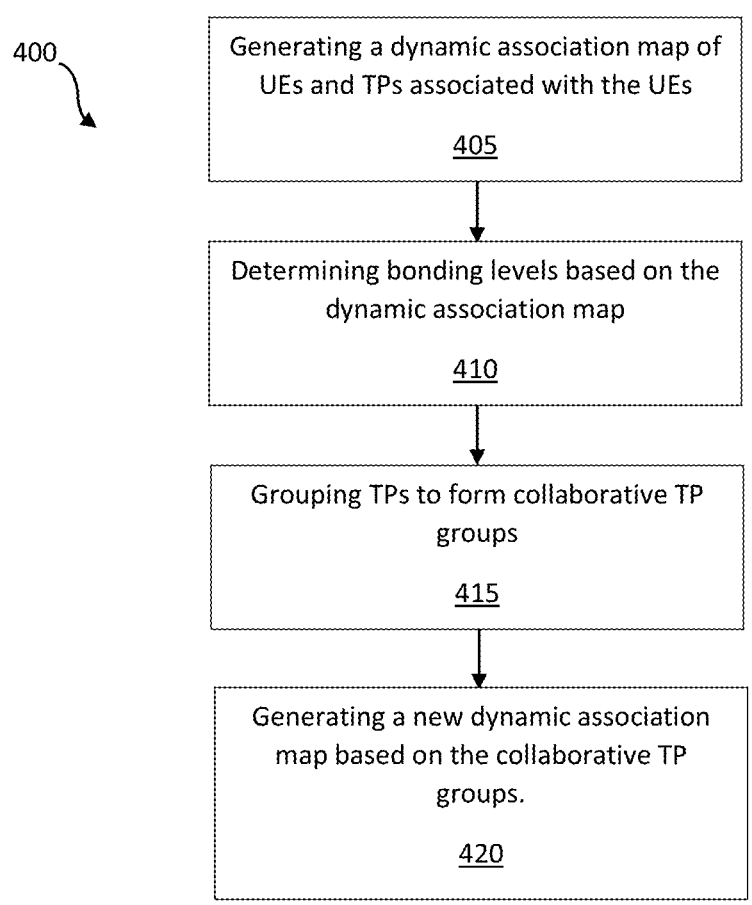
FIG. 4, is a flow chart illustrating an exemplary sequence of computer-implemented steps 400 for dynamically associating TPs with UEs of a radio network according to embodiments of the present invention.

With regard to FIG. 4, a flow chart illustrating an exemplary sequence of computer-implemented steps 400 for dynamically associating TPs with UEs of a radio network is depicted according to embodiments of the present invention. At step 405, a dynamic association map of UEs and TPs in a radio network is generated. At step 410, bonding levels between pairs of the TPs are determined based on the dynamic association map. The bonding levels represent how well the TP pair can cooperative in a collaborative TP group. At step 415, the TPs are grouped based on the bonding levels and the dynamic association map to form collaborative TP groups. Based on the new collaborative TP groups, a new dynamic association map is generated and may be used to configure the radio network at step 420.

Figure 5:
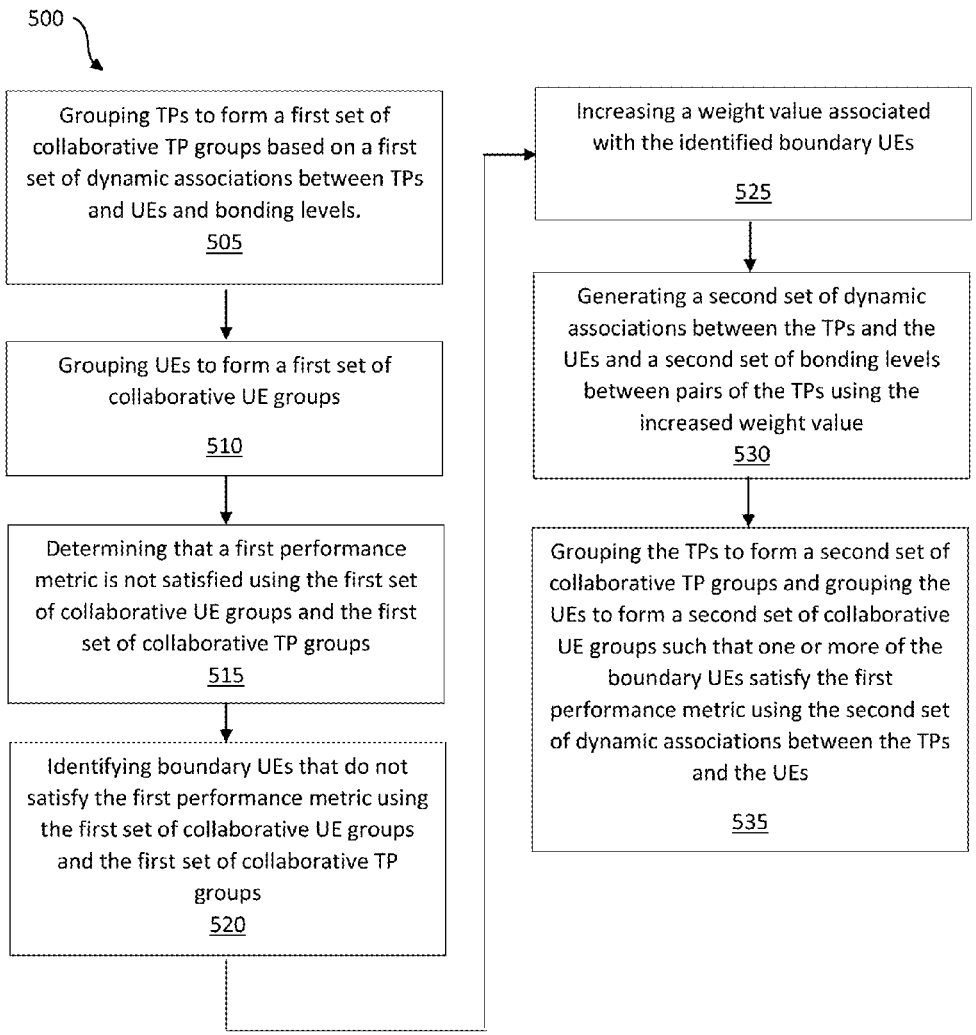
FIG. 5 is a flow chart illustrating an exemplary sequence of computer-implemented steps 500 for dynamically forming collaborative groups of TPs in a radio network according to embodiments of the present invention.

With regard to FIG. 5, a flow chart illustrating an exemplary sequence of computer-implemented steps 500 for dynamically configuring TPs of a radio network is depicted according to embodiments of the present invention. At step 505, a plurality of TPs are grouped to form a first set of collaborative TP groups. The TPs are grouped based on a first set of dynamic associations between TPs and UEs and a first set of bonding levels between pairs of TPs. At step 510, a plurality of UEs are grouped to form a first set of collaborative UE groups. At step 515, it is determined that a first performance metric is not satisfied using the first set of collaborative UE groups and the first set of collaborative TP groups. Boundary UEs that do not satisfy the first performance metric using the first set of collaborative UE groups and the first set of collaborative TP groups are identified at step 520. A weight value associated with the identified boundary UEs is increased at step 525. At step 530, a second set of dynamic associations between the TPs and the UEs and a second set of bonding levels between pairs of the TPs is generated using the increased weight value. At step 535, the TPs are grouped to form a second set of collaborative TP groups, and the UEs are grouped to form a second set of collaborative UE groups such that one or more of the boundary UEs satisfy the first performance metric using the second set of dynamic association between the TPs and the UEs.

According to some embodiments, multiple overlays are generated using the above described approach, and the overlay with the greatest performance at each resource allocation decision instance is selected to configure the network. For example, all UEs may initially be scheduled using a first overlay. The weighted rate of each UE is measured and summed to form an overlay performance metric. This process is repeated for each available overlay, and the overlay with the highest associated performance metric is selected to configure the network.

According to some embodiments, automatic load balancing and quality of services (QoS) guarantees may be provided by the use of soft TP-UE associations. These associations may take into account UE related metrics such as weight (e.g., traffic type, importance, incentives) and inter-UE collaboration, TP related metrics such as soft TP load, and network related metrics such as historic performance knowledge.

Figure 6A:
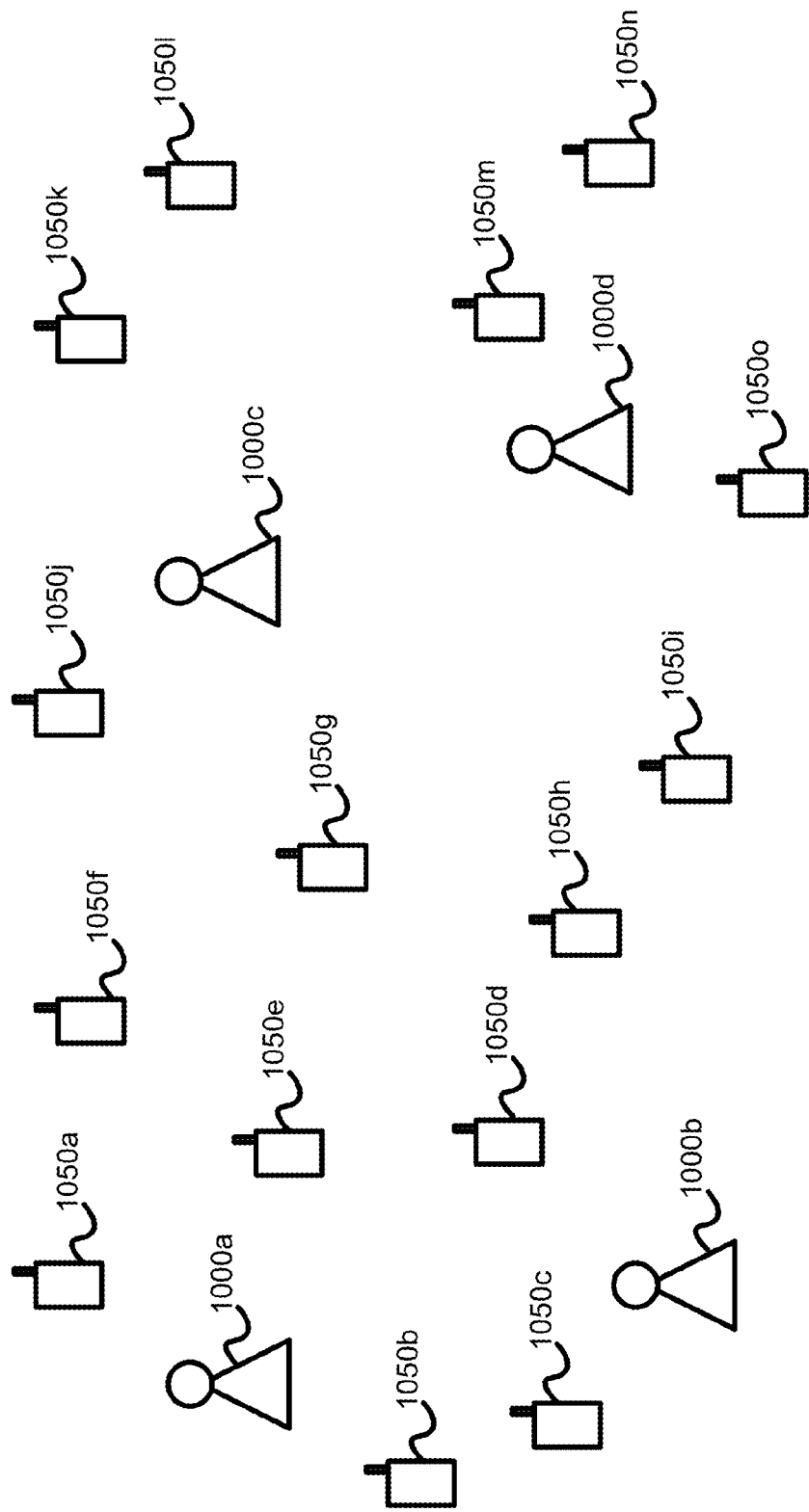
FIG. 6a is a diagram illustrating an exemplary deployment of TPs, with TP 1000a, TP 1000b, TP 1000c and TP 1000d deployed to provide coverage for a geographic area according to embodiments of the present invention.

As an example of the discussions above, FIG. 6a illustrates an exemplary deployment of TPs, with TP 1000a, TP 1000b, TP 1000c and TP 1000d, deployed to provide coverage for a geographic area. UEs 1050a-o are served by any or all of the TPs. In a conventional deployment, UEs will attach to a single TP, typically based on the maximum RSRP value. In some cases, such as for UE 1050b and 1050c, a high degree of interference may be experienced by a UE as a result of the location of the UEs between a serving TP and a non-serving TP. Non-serving TPs will be perceived as sources of interference by a UE.

Figure 6B:
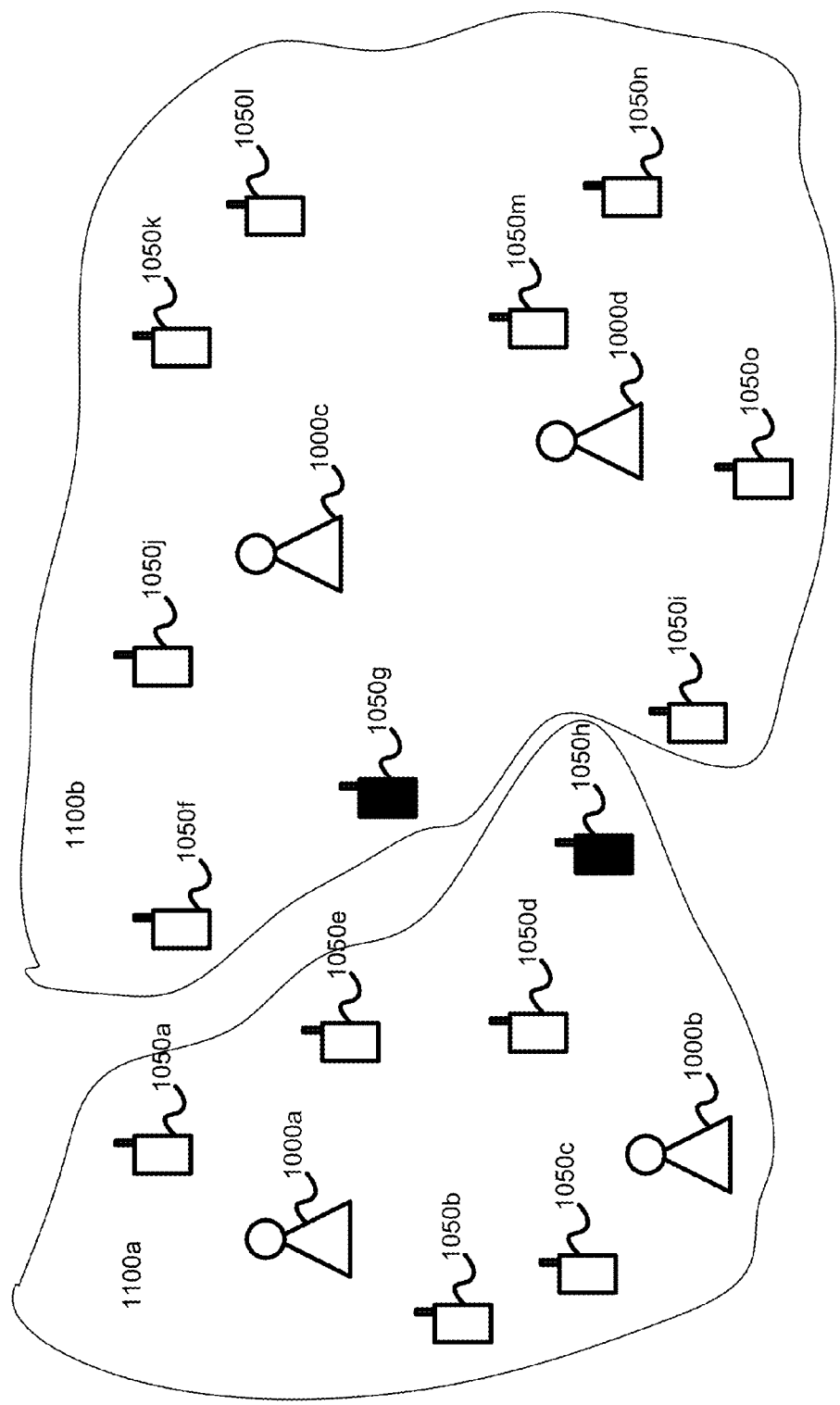
FIG. 6b is a diagram illustrating an exemplary overlay comprising grouped TPs according to embodiments of the present invention.

Soft TP-UE associations, which are indicative of which TPs each UE can receive signals from (either constructively or destructively) are determined, as are TP loading values, indicative of the amount of traffic handled by each TP. These values are then used to determine TP-TP bonding levels. A first overlay is then created based on the TP-TP bonding levels (e.g. using a Kernighan-Lin procedure). In creating an overlay, TPs are grouped together to create a VTP that serves a UEs. Those skilled in the art will appreciate that the creation of an overlay can also be considered to be the creation of a set of VTPs that are used to serve the UEs. Different overlays will have different VTP configurations. FIG. 6b illustrates one such overlay. VTP 1100a and VTP 1100b are created. As is shown, VTP 1100a eliminates the mutual interference caused by boundary conditions for UEs 1050b and 1050c. However, UEs 1050g and 1050h would be subjected to boundary conditions where the two VTPs will interfere with each other and degrade the service provided.

At this point, UE groupings can be calculated if so desired, with the goal of keeping all members of the UE grouping served by the same VTP.

Figure 6C:
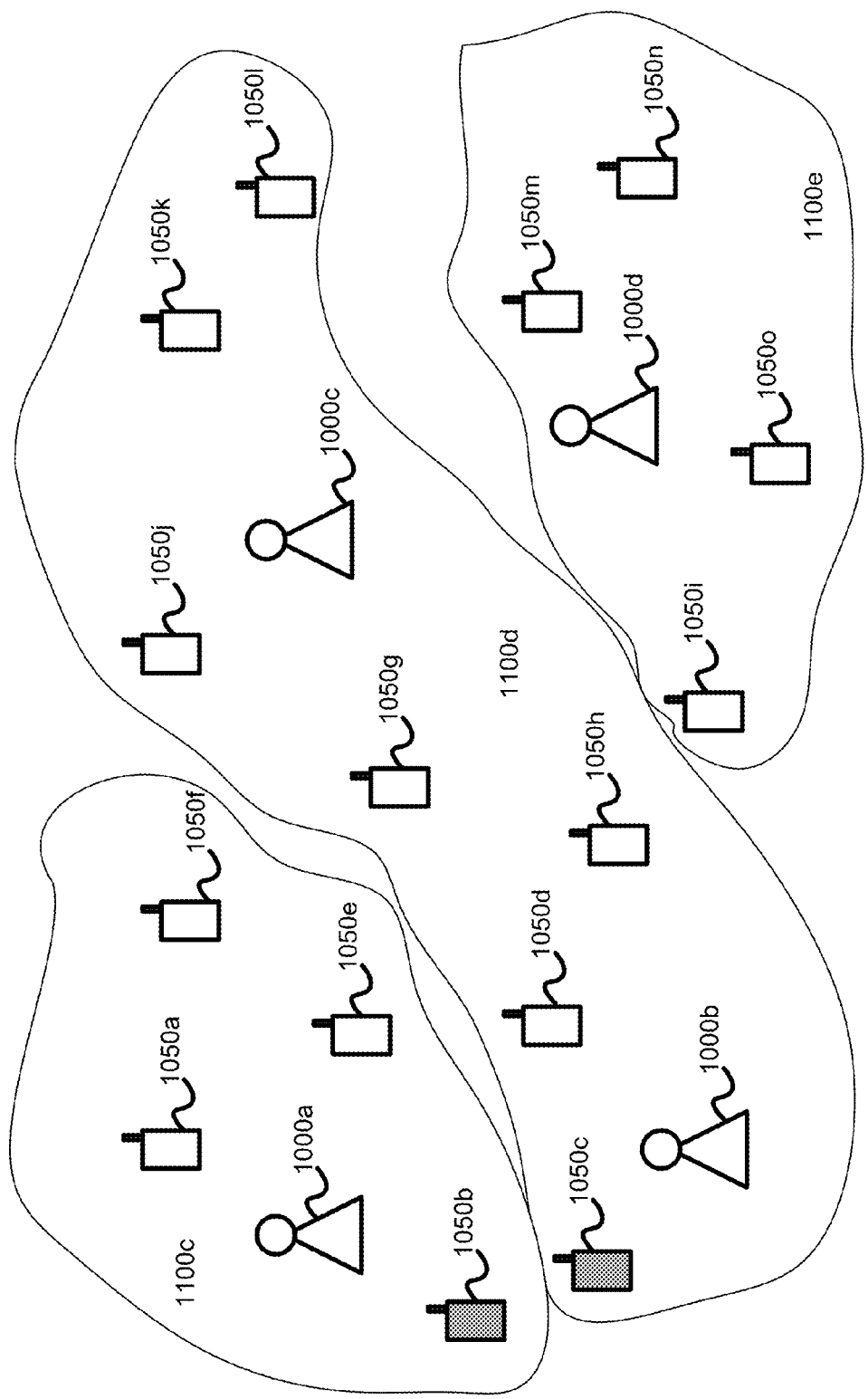
FIG. 6c is a diagram illustrating a second exemplary overlay that creates VTP 1100c, VTP 1100d and VTP 1100e, according to embodiments of the present invention.

To address the UEs subjected to boundary conditions, a subsequent overlay can be created with one of the creation objectives being to ensure that the identified UEs (1050g and 1050h) will not be subjected to boundary conditions. As noted above, this can be achieved by providing UE weighting factors in the Kernighan-Lin algorithms or through other techniques that will be understood by those skilled in the art. FIG. 6c illustrates an example of a second overlay that creates VTP 1100c, VTP 1100d and VTP 1100e. Using these overlays, UE 1050g and UE 1050h are served by VTP 1100d and are not subjected to boundary conditions. It is likely that UEs 1050b and 1050c will be subjected to degraded performance in the use of this overlay due to boundary conditions. However, if these are the only UEs subjected to this degradation, it is acceptable because they are properly served by another overlay.

The process of creating overlays can be repeated until each UE is served by at least one overlay in which it is not subject to the boundary conditions. The created set of overlays can then be used by the system. As will be understood by those skilled in the art, the network will often make use of Resource Block (RB) mappings of frequency and time blocks. Each RB can be assigned an overlay, so that within a fixed period of time, each overlay is used. This ensures that in each fixed period, each UE is served.

New sets of overlays can be created at fixed intervals, they can be created when UE movement exceeds a threshold, a UE performance metric is determined to be below a threshold, or whenever the system determines that a new set of overlays is needed. As noted before, each overlay (which can also be referred to as a VTP configuration) can be used for an RB, or for a plurality of RBs as is determined to best serve the UEs.

Figure 7:
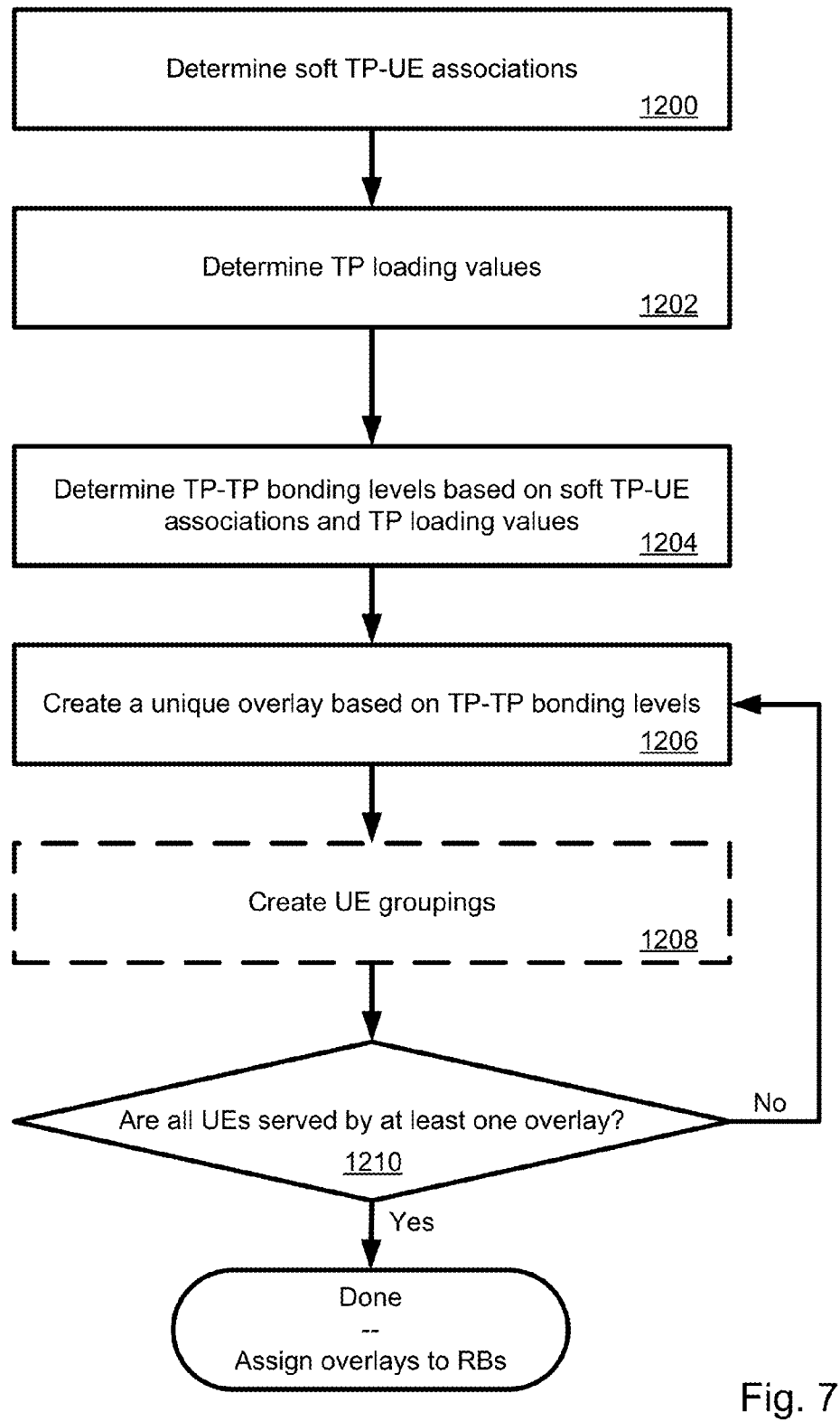
FIG. 7 is a flowchart illustrating an exemplary method of creating overlays according to embodiments of the present invention.

FIG. 7 is a flowchart illustrating an exemplary method of creating overlays as discussed above. In step 1200, soft TP-UE associations are determined. In step 1202 the TP loading values are determined. One skilled in the art will appreciate that in determining the soft TP-UE associations and the TP loading values, it may be preferable to do so in an iterative fashion. However, either iterative or single pass determinations can be used so long as they are sufficiently accurate. In step 1204, the TP-TP bonding levels are determined in accordance with the soft TP-UE associations and TP loading values. The TP-TP bonding levels are then used in step 1206 to create a unique overlay. In step 1208, UE groupings are optionally determined as part of the overlay. In step 1210, a determination is made as to whether each UE is adequately served by at least one of the generated overlays. As discussed above, one such measure of being adequately served may be whether the UE is subjected to boundary conditions based on the VTP configurations. If there has not yet been an overlay that serves a UE adequately, the process returns to step 1206 and another unique overlay is created. When a sufficient number of overlays has been created such that each UE is adequately served by at least one overlay, the process completes, and the network can begin a process of using overlays which may optionally entail assigning overlays to RBs.

Although exemplary embodiments of the present disclosure are described above with reference to the accompanying drawings, those skilled in the art will understand that the present disclosure may be implemented in various ways without changing the necessary features or the spirit of the present disclosure. The scope of the present disclosure will be interpreted by the claims below, and it will be construed that all techniques within the scope equivalent thereto belong to the scope of the present disclosure.

What is claimed is:

1. A method for dynamically associating transmit points (TPs) with user equipment (UEs) in a radio network, comprising:
   generating a dynamic association map comprising a plurality of UEs and a plurality of TPs associated with the UEs based on soft TP-UE association values between at least one of the plurality of UEs and at least one of the plurality of TPs, each of the soft TP-UE association values being calculated based on a loading value of a corresponding one of the TPs and a signal-to-interference-plus-noise ratio (SINR) value of a corresponding one of the UEs served by the corresponding TP, wherein a first UE of the UEs is associated with a first TP and a second TP of the plurality of TPs, the soft TP-UE association values comprise a first soft TP-UE association value indicating how much the first UE and the first TP are associated with each other and a second soft TP-UE association value indicating how much the first UE and the second TP are associated with each other, the first soft TP-UE association value is different from the second soft TP-UE association value, and the first and second soft TP-UE association values are greater than zero;

grouping the TPs based on the dynamic association map and at least one of UE weights, UE collaboration, or historic network performance metrics to form collaborative TP groups, wherein the collaborative TP groups coordinate scheduling to improve a network performance metric by increasing throughput; and generating a new dynamic association map based on the collaborative TP groups.

2. The method of claim 1, further comprising grouping the UEs to form collaborative UE groups based on the new dynamic association map and the collaborative TP groups.

3. The method claim 1, wherein generating the dynamic association map is further based on TP maximum throughput.

4. The method of claim 1, wherein the UE weights comprise at least one of traffic type and traffic importance.

5. The method of claim 1, wherein the forming collaborative TP groups of the TPs is further based on a quality of service (QoS) requirement of an existing TP-UE group association.

6. The method of claim 1, further comprising forming new collaborative TP groups based on a change in the dynamic association map.

7. The method of claim 1, further comprising repeating the method with a modified dynamic association map if a performance metric is not satisfied and halting the method when a performance metric is satisfied.

8. The method of claim 1, further comprising performing automatic load balancing based on the dynamic association map and a measured performance metric of the radio network.

9. The method of claim 1, wherein the dynamic association map comprises TP-UE associations that are transparent to the UEs.

10. The method of claim 1, wherein the collaborative TP groups further coordinate scheduling to improve the network performance metric by interference mitigation.

11. The method of claim 1, wherein the collaborative TP groups coordinate transmission to UEs and reception from UEs to improve a network performance metric.

12. The method of claim 2, wherein the collaborative UE groups coordinate transmission to TPs and reception from TPs to improve a network performance metric.

13. The method of claim 2, wherein the collaborative UE groups coordinate scheduling to optimize a network performance metric.

14. The method of claim 1, wherein generating a dynamic association map uses the equation:

$$a_{k,i} = \frac{1}{\text{load}_i} \log(1 + CSINR_{k,i}) \quad \forall k, i \in Z$$

(Z is the set of integers), wherein i denotes a TP index value from an array of TP index values, k denotes a UE index value from an array of UE index values, $a_{k,i}$ denotes a soft TP-UE association value between UE k and TP i, $\text{load}_i$ is a loading value for TP i, $CSINR_{k,i} = \max_{\forall H \subseteq H_k} CSINR_{k,i}(H)$, and $CSINR_{k,i}(H)$ is a SINR value of UE k served by TP i assuming all UEs in set H are helping.

15. The method of claim 1, wherein determining collaborative TP groups of the TPs is further based on the equation:

$$A_{i,j}^{(l)} = \sum_k f_k^{(l)} a_{k,i} \frac{P_{k,j}}{P_{k,i}} + \sum_k f_k^{(l)} a_{k,j} \frac{P_{k,i}}{P_{k,j}} \quad \forall i, j \in Z$$

(Z is the set of integers), wherein i denotes a first TP index value from an array of TP index values, j denotes a second TP index value from the array of TP index values, $A_{i,j}^{(l)}$ denotes a soft TP-TP bonding level between TP i and TP j, $$f_k^{(l)} = \begin{cases} 0 & \text{if } \max\{CSINR_k^{(0)}, \ldots, CSINR_k^{(l-1)}\} \geq c(\text{dB}) \\ 1 - \max\{0, \max\{CSINR_k^{(0)}, \ldots, CSINR_k^{(l-1)}\}/c(\text{dB})\} & \text{else} \end{cases}$$

k, l ∈ Z, l denotes an overlay index value from an array of overlay index values, k denotes a UE index value from an array of UE index values, $a_{k,i}$ denotes a soft TP-UE association value between UE k and TP i, $P_{k,i}$ is received power from TP i at UE k, and c(dB) is a performance threshold.

16. The method of claim 1, wherein a second UE of the UEs is associated with the first TP, and the first soft TP-UE association value between the first UE and the first TP is different from a third soft TP-UE association value between the second UE and the first TP.

17. A method for dynamically forming collaborative groups of transmit points (TPs) in a radio network, comprising:

grouping the TPs to form a first set of collaborative TP groups based on a first set of dynamic associations between the TPs and user equipments (UEs) of the radio network, and a first set of bonding levels between pairs of the TPs, the first set of dynamic associations being based on a first set of soft TP-UE association values between at least one of the UEs and at least one of the TPs, each of the first set of soft TP-UE association values being calculated based on a loading value of a corresponding one of the TPs and a signal-to-interference-plus-noise ratio (SINR) value of a corresponding one of the UEs served by the corresponding TP, wherein a first UE of the UEs is associated with a first TP and a second TP of the TPs, the first set of soft TP-UE association values comprise a first soft TP-UE association value indicating how much the first UE and the first TP are associated with each other and a second soft TP-UE association value indicating how much the first UE and the second TP are associated with each other, the first soft TP-UE association value is different from the second soft TP-UE association value, and the first and second soft TP-UE association values are greater than zero;

grouping the UEs to form a first set of collaborative UE groups;

determining that a first performance metric is not satisfied using the first set of collaborative UE groups and the first set of collaborative TP groups;

identifying boundary UEs that do not satisfy the first performance metric using the first set of collaborative UE groups and the first set of collaborative TP groups;

increasing a weight value associated with the identified boundary UEs;

generating a second set of dynamic associations between the TPs and the UEs and a second set of bonding levels between pairs of the TPs using the increased weight value; and grouping the TPs to form a second set of collaborative TP groups and grouping the UEs to form a second set of collaborative UE groups, wherein one or more of the boundary UEs satisfy the first performance metric using the second set of dynamic associations between the TPs and the UEs.

18. The method of claim 17, wherein the first and second sets of collaborative TP groups coordinate scheduling to improve a network performance metric by interference mitigation or optimizing throughput.

19. The method of claim 17, wherein the first and second sets of collaborative TP groups coordinate transmission to UEs and reception from UEs to improve a network performance metric.

20. The method of claim 17, wherein the first and second sets of collaborative UE groups coordinate transmission to TPs and reception from TPs to improve a network performance metric by interference mitigation or optimizing throughput.

21. The method of claim 17, wherein the first and second sets of collaborative UE groups coordinate scheduling to optimize a network performance metric.

22. The method of claim 17, further comprising generating a dynamic association map for the UEs and the TPs using the equation:

$$a_{k,i} = \frac{1}{\text{load}_i} \log(1 + CSINR_{k,i}) \; \forall \, k, i \in Z$$

(Z is the set of integers), wherein i denotes a TP index value from an array of TP index values; k denotes a UE index value from an array of UE index values, $a_{k,i}$ denotes a soft TP-UE association value between UE k and TP i, $\text{load}_i$ is a loading value for TP i, $CSINR_{k,i} = \max_{\forall H \subseteq_k} CSINR_{k,i}(H)$, and $CSINR_{k,i}(H)$ is a SINR value of UE k served by TP i assuming all UEs in set H are helping.

23. The method of claim 22, wherein the dynamic association map is generated based on at least one of UE weights, UE collaboration, historic network performance metrics, and TP maximum throughput.

24. The method of claim 23, wherein the UE weights comprise at least one of traffic type and traffic importance.

25. The method of claim 17, further comprising determining a bonding level between pairs of the TPs using the equation:

$$A_{i,j}^{(l)} = \sum_k f_k^{(l)} a_{k,i} \frac{P_{k,j}}{P_{k,i}} + \sum_k f_k^{(l)} a_{k,j} \frac{P_{k,i}}{P_{k,j}} \; \forall \, i, j \in Z$$

(Z is the set of integers), wherein i denotes a first TP index value from an array of TP index values, j denotes a second TP index value from the array of TP index values, $A_{i,j}^{(l)}$ denotes a soft TP-TP bonding level between TP i and TP j, $$f_k^{(l)} = \begin{cases} 0 & \text{if } \max\{CSINR_k^{(0)}, \ldots, CSINR_k^{(l-1)}\} \geq c(\text{dB}) \\ 1 - \max\{0, \max\{CSINR_k^{(0)}, \ldots, CSINR_k^{(l-1)}\}/c(\text{dB})\} & \text{else} \end{cases}$$

k, l ∈ Z, l denotes an overlay index value from an array of overlay index values, k denotes a UE index value from an array of UE index values, $a_{k,i}$ denotes a soft TP-UE association value between UE k and TP i, $P_{k,i}$ is received power from TP i at UE k, and c(dB) is a performance threshold.

26. The method of claim 25, wherein the bonding level between pairs of the TPs is determined further based on a QoS requirement of an existing TP-UE group association.

27. The method of claim 17, wherein a second UE of the UEs is associated with the first TP, and the first soft TP-UE association value between the first UE and the first TP is different from a third soft TP-UE association value between the second UE and the first TP.

28. A method for forming groups of Transmit Points in a radio network, comprising:

determining soft associations between a plurality of transmit points (TPs) and a plurality of user equipments (UEs) of the radio network based on soft TP-UE association values between at least one of the plurality of UEs and at least one of the plurality of TPs, each of the soft TP-UE association values being calculated based on a loading value of a corresponding one of the TPs and a signal-to-interference-plus-noise ratio (SINR) value of a corresponding one of the UEs served by the corresponding TP, wherein a first UE of the UEs is associated with a first TP and a second TP of the plurality of TPs, the soft TP-UE association values comprise a first soft TP-UE association value indicating how much the first UE and the first TP are associated with each other and a second soft TP-UE association value indicating how much the first UE and the second TP are associated with each other, the first soft TP-UE association value is different from the second soft TP-UE association value, and the first and second soft TP-UE association values are greater than zero;

determining loading values for each of the plurality of TPs;

determining bonding levels for pairs of TPs based on the soft associations, the loading values, and at least one of UE weights, UE collaboration, or historic network performance metrics; and generating a first overlay, grouping subsets of the plurality of TPs into virtual TPs (VTPs) based on the bonding levels.

29. The method of claim 28, wherein the step of generating a first overlay is part of a step of generating a series of distinct overlays, each overlay defining a unique configuration of VTP's, where each VTP is a grouping of TPs in the plurality of TPs, and where every UE is provided a threshold level of service in at least one of the series of distinct overlays.

30. The method of claim 28, further comprising generating a subsequent overlay, different from the first overlay, in accordance with the determined bonding levels and an identification of a UE not receiving a threshold level of service.

31. The method of claim 28, further comprising defining a set of UEs served by the same VTP as a collaborative UE grouping.

32. The method of claim 31, wherein the UEs in the collaborative UE grouping coordinate scheduling to optimize a network performance metric.

33. The method of claim 28, wherein the soft associations are generated using the equation:

$$a_{k,i} = \frac{1}{\text{load}_i} \log(1 + CSINR_{k,i}) \ \forall \, k, i \in Z$$

(Z is the set of integers), wherein i denotes a TP index value from an array of TP index values, k denotes a UE index value from an array of UE index values, $a_{k,i}$ denotes a soft TP-UE association value between UE k and TP i, $\text{load}_i$ is a loading value for TP i, $CSINR_{k,i} = \max_{\forall H \subseteq H_k} CSINR_{k,i}(H)$, and $CSINR_{k,i}(H)$ is a SINR value of UE k served by TP i assuming all UEs in set H are helping.

34. The method of claim 33, wherein the soft associations are further based on TP maximum throughput.

35. The method of claim 34, wherein the UE weights comprise at least one of traffic type and traffic importance.

36. The method of claim 28, wherein the bonding levels are determined using the equation:

$$A_{i,j}^{(l)} = \sum_k f_k^{(l)} a_{k,i} \frac{P_{k,j}}{P_{k,i}} + \sum_k f_k^{(l)} a_{k,j} \frac{P_{k,i}}{P_{k,j}} \ \forall \, i, j \in Z$$

(Z is the set of integers), wherein i denotes a first TP index value from an array of TP index values, j denotes a second TP index value from the array of TP index values, $A_{i,j}^{(l)}$ denotes a soft TP-TP bonding level between TP i and TP j, $$f_k^{(l)} = \begin{cases} 0 & \text{if } \max\{CSINR_k^{(0)}, \ldots, CSINR_k^{(l-1)}\} \geq c(\text{dB}) \\ 1 - \max\{0, \max\{CSINR_k^{(0)}, \ldots, CSINR_k^{(l-1)}\}/c(\text{dB})\} & \text{else} \end{cases}$$

k, l ∈ Z, l denotes an overlay index value from an array of overlay index values, k denotes a UE index value from an array of UE index values, $a_{k,i}$ denotes a soft TP-UE association value between UE k and TP i, $P_{k,i}$ is received power from TP i at UE k, and c(dB) is a performance threshold.

37. The method of claim 28, wherein a second UE of the UEs is associated with the first TP, and the first soft TP-UE association value between the first UE and the first TP is different from a third soft TP-UE association value between the second UE and the first TP.

38. A radio network comprising:
a non-transitory memory storage comprising instructions; and
one or more processors in communication with the non-transitory memory storage, wherein the one or more processors execute the instructions to:
generate a dynamic association map comprising a plurality of UEs and a plurality of TPs associated with the UEs based on soft TP-UE association values between at least one of the plurality of UEs and at least one of the plurality of TPs, each of the soft TP-UE association values being calculated based on a loading value of a corresponding one of the TPs and a signal-to-interference-plus-noise ratio (SINR) value of a corresponding one of the UEs served by the corresponding TP, wherein a first UE of the UEs is associated with a first TP and a second TP of the plurality of TPs, the soft TP-UE association values comprise a first soft TP-UE association value indicating how much the first UE and the first TP are associated with each other and a second soft TP-UE association value indicating how much the first UE and the second TP are associated with each other, the first soft TP-UE association value is different from the second soft TP-UE association value, and the first and second soft TP-UE association values are greater than zero;
group the TPs based on the dynamic association map and at least one of UE weights, UE collaboration, or historic network performance metrics to form collaborative TP groups, wherein the collaborative TP groups coordinate scheduling to improve a network performance metric by increasing throughput; and
generate a new dynamic association map based on the collaborative TP groups.

39. The radio network of claim 38, wherein a second UE of the UEs is associated with the first TP, and the first soft TP-UE association value between the first UE and the first TP is different from a third soft TP-UE association value between the second UE and the first TP.

40. A radio network comprising:
a non-transitory memory storage comprising instructions; and
one or more processors in communication with the non-transitory memory storage, wherein the one or more processors execute the instructions to:
group the TPs to form a first set of collaborative TP groups based on a first set of dynamic associations between the TPs and user equipments (UEs) of the radio network, and a first set of bonding levels between pairs of the TPs, the first set of dynamic associations being based on a first set of soft TP-UE association values between at least one of the UEs and at least one of the TPs, each of the first set of soft TP-UE association values being calculated based on a loading value of a corresponding one of the TPs and a signal-to-interference-plus-noise ratio (SINR) value of a corresponding one of the UEs served by the corresponding TP, wherein a first UE of the UEs is associated with a first TP and a second TP of the TPs, the first set of soft TP-UE association values comprise a first soft TP-UE association value indicating how much the first UE and the first TP are associated with each other and a second soft TP-UE association value indicating how much the first UE and the second TP are associated with each other, the first soft TP-UE association value is different from the second soft TP-UE association value, and the first and second soft TP-UE association values are greater than zero;
group the UEs to form a first set of collaborative UE groups;
determine that a first performance metric is not satisfied using the first set of collaborative UE groups and the first set of collaborative TP groups;
identify boundary UEs that do not satisfy the first performance metric using the first set of collaborative UE groups and the first set of collaborative TP groups;

increase a weight value associated with the identified boundary UEs;

generate a second set of dynamic associations between the TPs and the UEs and a second set of bonding levels between pairs of the TPs using the increased weight value; and group the TPs to form a second set of collaborative TP groups and grouping the UEs to form a second set of collaborative UE groups, wherein one or more of the boundary UEs satisfy the first performance metric using the second set of dynamic associations between the TPs and the UEs.

41. The radio network of claim 40, wherein a second UE of the UEs is associated with the first TP, and the first soft TP-UE association value between the first UE and the first TP is different from a third soft TP-UE association value between the second UE and the first TP.

42. A radio network comprising:

a non-transitory memory storage comprising instructions; and one or more processors in communication with the non-transitory memory storage, wherein the one or more processors execute the instructions to:

determine soft associations between a plurality of transmit points (TPs) and a plurality of user equipments (UEs) of the radio network based on soft TP-UE association values between at least one of the plurality of UEs and at least one of the plurality of TPs, each of the soft TP-UE association values being calculated based on a loading value of a corresponding one of the TPs and a signal-to-interference-plus-noise ratio (SINR) value of a corresponding one of the UEs served by the corresponding TP, wherein a first UE of the UEs is associated with a first TP and a second TP of the plurality of TPs, the soft TP-UE association values comprise a first soft TP-UE association value indicating how much the first UE and the first TP are associated with each other and a second soft TP-UE association value indicating how much the first UE and the second TP are associated with each other, the first soft TP-UE association value is different from the second soft TP-UE association value, and the first and second soft TP-UE association values are greater than zero;

determine loading values for each of the plurality of TPs;

determine bonding levels for pairs of TPs based on the soft associations, the loading values, and at least one of UE weights, UE collaboration, or historic network performance metrics; and generate a first overlay, grouping subsets of the plurality of TPs into virtual TPs (VTPs) based on the bonding levels.

43. The radio network of claim 42, wherein a second UE of the UEs is associated with the first TP, and the first soft TP-UE association value between the first UE and the first TP is different from a third soft TP-UE association value between the second UE and the first TP.

* * * * *